United States Patent Office 2,979,045
Patented Apr. 11, 1961

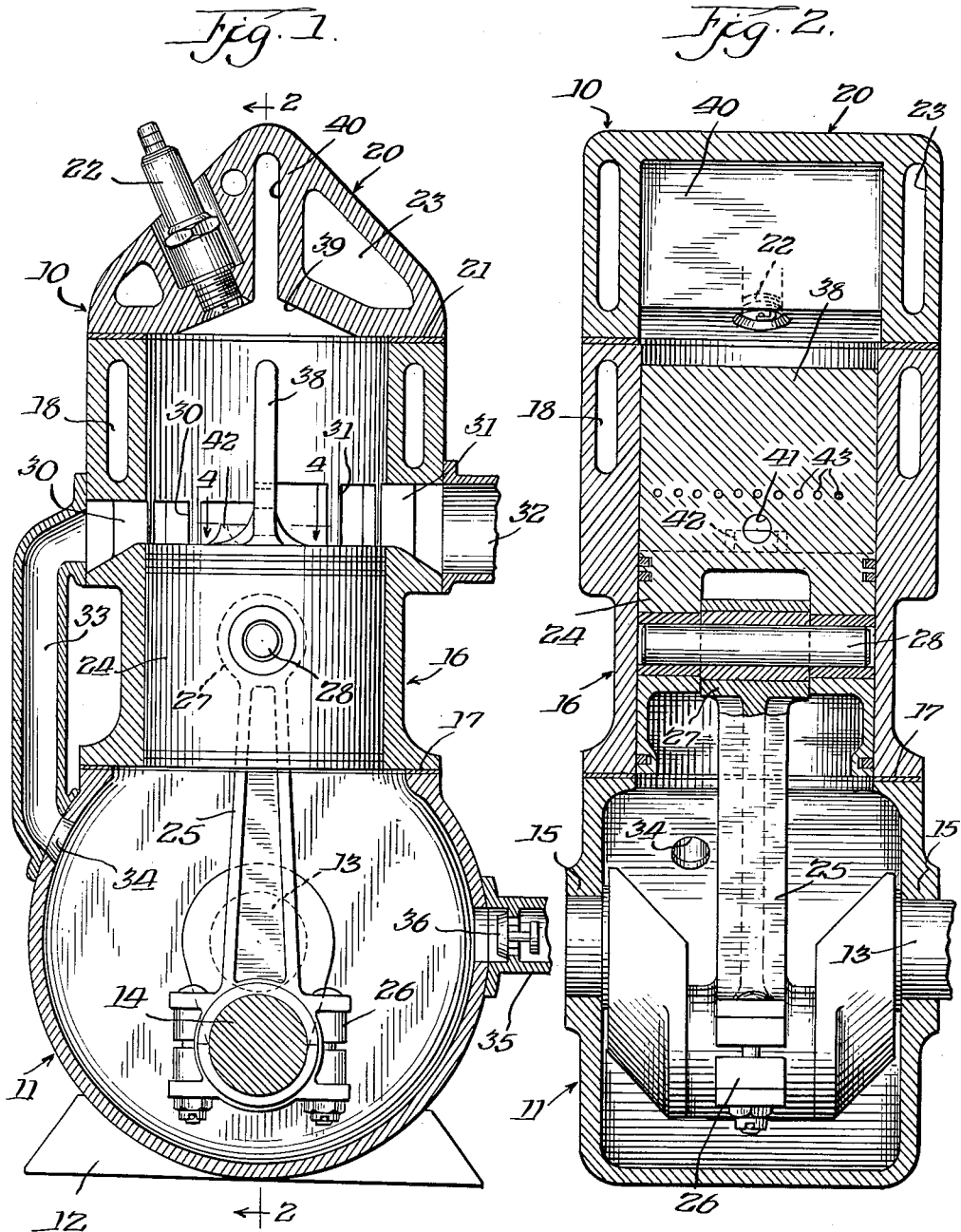

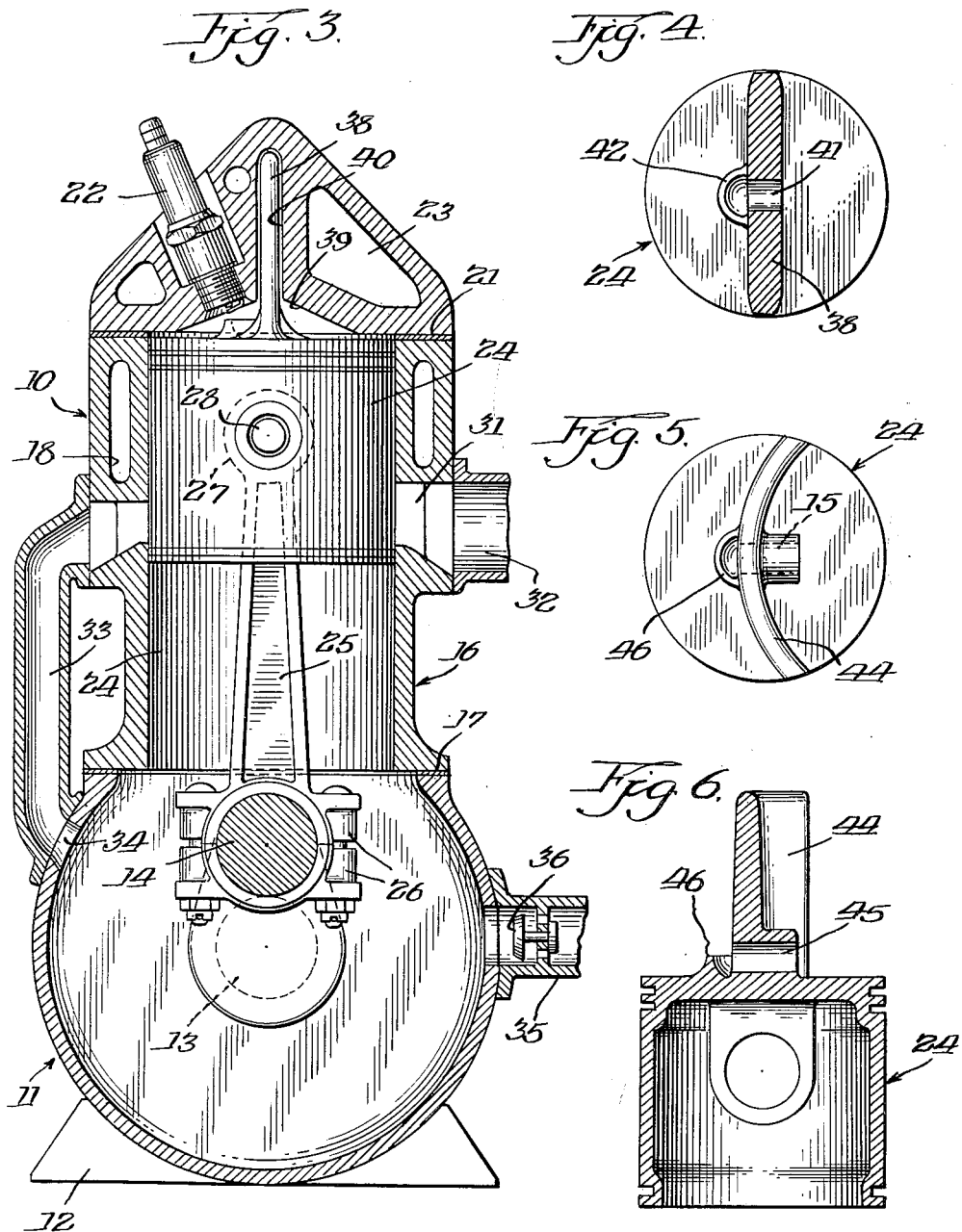

2,979,045

BLADE BAFFLED TWO-CYCLE ENGINE

Frank R. Busch, 5235 W. 79th St., Oak Lawn, Ill.

Filed Sept. 4, 1959, Ser. No. 838,217

3 Claims. (Cl. 123—65)

The invention relates to internal combustion engines and has reference in particular to two-cycle engines incorporating new and novel design features for improving the operating performance and also the fuel economy of the engines.

The most common two-cycle engine such as used in outboard motors, lawn mowers, motor bikes, and the like, has both intake and exhaust ports situated at the bottom end of the cylinder. This construction makes it the cheapest of any internal combustion engine to build, but the resulting inefficiency in scavenging the cylinders to exhaust the products of combustion also makes it one of the most wasteful of fuel. In such engines the cylinder is always filled to approximately atmospheric pressure with a mixture of fresh charge and exhaust products. The proportions of each are determined by the engine load and the efficiency at full power in scavenging the burnt gases from the cylinder. Although several factors exist during operation which promote engine efficiency, nevertheless, the dilution of the fresh charge with inert products makes ignition far more difficult. This condition is most critical at light engine loads when dilution is at a maximum. The result is that in order to obtain regular firing, extremely rich mixtures are required with corresponding poor fuel economy.

The main objective of the invention is to improve the efficiency of a two-cycle internal combustion engine by reducing the intermixing of the fresh charge and burnt gases to a minimum, by reducing or entirely eliminating loss of fresh charge through the exhaust port, and in segregating the fresh charge from the burnt gases, particularly at partial throttle operation so that ignition can take place in a region where a minimum of burnt gases are present.

A more specific object of the invention resides in the provision of a relatively long, thin baffle on the piston and which is adapted to enter a slot in the head of a cylinder on the up-stroke of the piston. Thus the baffle divides the combustion chamber into two distinct areas, one being located on the intake side and the other on the exhaust side of the cylinder. Also, in accordance with the invention the areas are connected by means of one or more flame transfer openings at the base of the baffle. The flame transfer openings serve a dual purpose, since, in addition to transferring the ignition flame from the intake area to the exhaust area, it permits equalization of pressure in both areas. When the piston is in bottom dead center position, the baffle is withdrawn from the slot and since the intake and exhaust ports are then open, the scavenging of the cylinder is improved and intermixing of the fresh charge with the burnt gases is reduced to a minimum.

Another object of the invention is to provide a two-cycle internal combustion engine having a piston with a baffle fixed thereto for coaction with a slot in the head of the cylinder and wherein the baffle and slot are designed for minimum clearance consistent with mechanical considerations, and which substantially eliminates flow of the combustible gases into the slot during operation.

Another object of the invention is to provide a blade baffled two-cycle engine such as described wherein the blade extends across the top of the piston with sufficient clearance to prevent contact with the cylinder walls, and wherein the blade has a length so as to leave the slot at about the same time that the exhaust port is opened. This avoids any possibility of the baffle acting as an obstruction to gas flow although providing a gas flow path of maximum length to assure complete scavenging of the cylinder.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

Figure 1 is a longitudinal sectional view illustrating a blade baffled two-cycle engine constructed in accordance with the present invention and showing the piston in bottom dead center position;

Figure 2 is a sectional view taken substantially along line 2—2 of Figure 1;

Figure 3 is a longitudinal sectional view similar to Figure 1 but showing the piston in top dead center position;

Figure 4 is a transverse sectional view taken through the baffle substantially on line 4—4 of Figure 1;

Figure 5 is a top plan view showing a modified form of curved blade fixed to a piston for the purposes of the invention; and Figure 6 is a longitudinal sectional view taken substantially along line 6—6 of Figure 5.

The two-cycle internal combustion engine 10 of Figure 1 which has been selected for illustrating the present invention is basically conventional in design, consisting of a crank case 11 having a base 12 for supporting the engine on a flat surface. The crank case journals a crank shaft 13 having a crank portion 14, the shaft being journalled for rotation at respective sides 15 of the crank case and said shaft extending from at least one side of the crank case for delivering its power to other mechanism which is not shown. The cylinder 16 of the engine is suitably connected to the crank case at 17, and for a water-cooled engine the outer walls of the cylinder in the upper portion thereof are cored at 18 to provide flow passages for the cooling fluid. The cylinder head 20 is joined to the cylinder at 21 and said head contains the spark plug 22, and the same is also cored at 23 for circulating the cooling fluid through the head.

The piston 24 is mounted within the cylinder 16 for reciprocating movement for the length of the cylinder, and for so actuating the piston the usual connecting rod 25 is provided, the same having a split hub portion 26 for connection with the crank portion 14 of the crank shaft 13. The connecting rod is provided with another hub portion at 27 for receiving the connecting pin 28 which joins the connecting rod to the piston within and approximately centrally of the same. When the piston is in its bottom dead center position, the inlet ports 30 and also the exhaust ports 31 are open for admitting combustible gases to within the cylinder and for exhausting the burnt gases from the cylinder through the outlet connection 32. The inlet connection 33 joins the inlet ports 30 with the opening 34 in the crank case, and the gas and air mixture which is first admitted to the crank case is thus delivered by the connection 33 to the cylinder in timed relation with the reciprocating movements of the piston. The numeral 35 indicates a supply line for delivering the gas and air mixture to the crank case and said supply line is conventionally equipped with a poppet valve 36 which opens and closes automatically in synchronism with the up and down movement of the piston. In Figure 1 the poppet valve is closed, since the downward movement of the piston, which has just been completed, has compressed the combustible gases within the crank case and which were delivered to within the cylinder upon the opening of the inlet ports 30. Simultaneously with this action the burnt gases resulting from the power stroke are exhausted through outlet 32 to the atmosphere. Upward travel of the piston will presently close the inlet and outlet ports and this upward movement of the piston will produce a subatmospheric pressure within the crank case sufficient to automatically open the poppet valve and draw in another charge of gas and air mixture from the supply line 35. The cycle of operations is then repeated, since downward movement of the piston will compress the charge within the crank case effecting automatic closing of the poppet valve 36 and delivery of the charge to the cylinder following the next power stroke.

In accordance with the invention the top wall of the piston 24 is provided with a blade or baffle 38, and for receiving the same the head 20 of the cylinder is provided with a slot 40. The baffle 38 is provided with one or more flame transfer openings 41 located at the base of the baffle and in coacting relation with the semi-circular diverting wall 42. Additional openings such as 43 may be formed in the blade 38 to assist in equalizing the pressure on the respective sides of the baffle. When said baffle is located within the slot 40 it divides the combustion chamber into an inlet area on one side thereof and into an outlet area on the other side. It is desired to maintain the clearance between the baffle and the slot at a minimum consistent with mechanical considerations. Minimum clearance is desirable for two reasons; one, the radiation of heat from the baffle to the slot surface is facilitated, and, two, the possibility of combustion occurring in the clearance space is eliminated. Also, by selecting the proper thickness of the baffle in relation to the volume of the slot, a ratio can be obtained which approximates the compression ratio of the entire cylinder, thereby eliminating flow of the combustible gases into the slot during the compression stroke. It is also possible to have this ratio exceed that of the compression ratio of the cylinder. This construction will tend to counteract the initial pressure rise in the cylinder following combustion and delay and reduce flow of hot gases into the slot.

From the foregoing it is apparent that the combustion chamber or chambers are entirely separate from the baffle-slot combination. This divorce enables the use of a combustion chamber design known as the wedge type chamber. As modified for use with the present design of engine, the chambers as formed by the baffle, taper to a maximum height at 39. The spark plug location follows standard practice with this type of combustion chamber, being positioned at a maximum height immediately adjacent to the slot and to the flame transfer opening 41 provided in the baffle as shown in Figure 3. The reason for having the spark plug as close as possible to the flame transfer opening when the piston is in top dead center position, is to facilitate the ignition of the combustible gases in the exhaust area with minimum time lag. The flame transfer opening serves a dual purpose, since, in addition to transferring the flame from the intake area to the exhaust area it serves to equalize the pressure on both sides of the baffle. Although the opening removes the necessity for two spark plugs, nevertheless dual ignition may be desirable from a reliability standpoint, as in the case of aircraft engines. The size of the flame transfer opening will vary with the displacement of the cylinder, since it must equalize the pressure on the respective sides of the baffle without excessive delay. With this limitation in mind it is desirable to keep the size of the opening as small as possible to minimize flow of the fresh mixture to the opening when said fresh mixture is entering the cylinder through the inlet ports 30. To further reduce loss of mixture from this source it is possible to direct the flow through the intake ports 30 upwardly in a direction approximately parallel to the baffle rather than directly against the baffle. Also, the semi-circular diverting wall can be provided at the entrance to the transfer opening to divert the incoming gases away from the opening.

The design of the baffle 38 is not subject to rigid restrictions. The baffle can be made as an insert for the piston, or the baffle can be formed as an integral part of the piston. Heat resisting material such as alloy steel is preferred for the baffle and the same may be tapered with its thickest section at its base for increased strength, as shown in Figure 6. The baffle of Figures 1 and 3 extends diametrically of the piston and sufficient clearance is provided on respective sides so that the baffle does not contact the cylinder walls. In addition to a straight baffle as shown in Figure 4, the baffle may be given a crescent or a curved shape when viewed in top plan as best illustrated in the modification of Figures 5 and 6. The curved baffle 44 is formed with a flame transfer opening 45 of increased length and on the inlet area side the diverting wall 46 is provided. Besides giving stiffness to the baffle without additional weight, the curved shape permits variation in the relative areas of the intake and exhaust ports without affecting the desired volumes of the intake and exhaust areas of the combustion chamber. Also, the baffles of Figures 4 and 5 may be shifted in their position on the top wall of the piston to provide any desired ratio of volume between the intake and exhaust areas on respective sides thereof. The most common volume relationship will probably be about even, although it is possible that for certain specialized applications a variation in this ratio would be desirable. For example, for an engine where the expected load factor would be light or would vary over a wide range, it might be desirable to have about thirty percent of the cylinder volume on the intake side, with seventy percent on the exhaust side. This arrangement would keep dilution with exhaust gases to a minimum under light load conditions. On an engine where the expected load factor would be high, the reverse arrangement of cylinder volumes might be preferred. Side thrust on the piston would be reduced, and with normal volumetric efficiency there would be substantially no combustible gases on the exhaust side so that a single spark plug would suffice without any time lag associated with the flame transfer opening.

The height of the baffle should be selected so that the baffle will leave the slot at about the same time that the exhaust ports are opened. This synchronization avoids any possibility of the baffle acting as an obstruction to gas flow while providing a gas flow path of maximum length to assure complete scavenging of the cylinder.

One of the important advantages obtained by the piston blade of the invention is an increase in the circumferential length of the intake and exhaust ports. In other engines having inlet and exhaust ports at the bottom of the cylinder, a considerable amount of the available area cannot be utilized for ports since the incoming mixture would be even more prone to flow out of an immediately adjacent exhaust port. With the piston blade of the present design, virtually the entire circumference of the cylinder can be employed since the baffle serves as a positive wall between the intake and exhaust ports. Another increase in power output is possible by increasing the height of the ports. Conventional engines are limited in this respect by the tendency of the fresh charge to pass over the top of the piston deflector and out the exhaust port. No such limitations are imposed on the present design.

Because of the greatly reduced dilution of fresh charge in the intake combustion chamber, the time required to ignite and burn the fuel will be greatly reduced. This permits the use of less spark advance and a reduced range of spark timing over the entire speed range of the engine, with a corresponding increase in efficiency.

Although the foregoing has dealt exclusively with the application of the invention to gasoline engines, many of its advantages also apply to diesel engines. With suitable adaptations to diesel engine requirements, a considerable gain in power output, efficiency and economy of manufacture can be obtained.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In an internal combustion engine, the combination with a cylinder having a part providing a cylinder head and a piston mounted within the cylinder for reciprocating movement, of inlet and exhaust ports located in the walls of the cylinder and which are fully open when the piston is in bottom dead center position, a baffle fixed to the top wall of the piston and extending from one side of the cylinder to the other to separate the inlet and exhaust ports without however contacting the cylinder walls, and a slot in the cylinder head located in alignment with the baffle and adapted to receive the baffle when the piston is located in top dead center position, said baffle having a flame transfer opening in its base adjacent the top wall of the piston, a diverting wall on the said top wall of the piston in associated relation with the flame transfer opening and located entirely on one side of the baffle, and said baffle having a length such that the baffle completely leaves the slot approximately simultaneously with the opening of the exhaust port.

2. In an internal combustion engine, the combination with a cylinder having a part providing a cylinder head and a piston mounted within the cylinder for reciprocating movement, of inlet and exhaust ports located in the wall of the cylinder and which are fully open when the piston is in bottom dead center position, a relatively thin baffle fixed to the top wall of the piston and extending from one side of the cylinder to the other to separate the inlet and exhaust ports without however contacting the cylinder walls, a slot in the cylinder head located in alignment with the baffle and adapted to fully receive the baffle when the piston is located in top dead center position, said baffle having a flame transfer opening in its base portion and a plurality of other openings located above the flame transfer opening for equalizing the pressure within the cylinder on respective sides of the baffle, and the cylinder head providing an interior surface which tapers from the slot to diametrically opposite sides of the cylinder in a direction inwardly of the cylinder.

3. An internal combustion engine as defined by claim 2, wherein the slot provides minimum clearance as regards the baffle and wherein the baffle has a length such that the baffle completely leaves the slot approximately simultaneously with the opening of the exhaust port.

References Cited in the file of this patent

FOREIGN PATENTS

| 23,658 | Great Britain | Oct. 15, 1909 |
| 458,368 | Great Britain | Dec. 15, 1936 |